US007513660B2

(12) United States Patent
Spartano et al.

(10) Patent No.: US 7,513,660 B2
(45) Date of Patent: Apr. 7, 2009

(54) LIGHTING DEVICE HAVING FORWARD DIRECTED HEAT SINK ASSEMBLY

(75) Inventors: David A. Spartano, Brunswick, OH (US); Michael S. Squires, Ryde (AU)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 11/765,810

(22) Filed: Jun. 20, 2007

(65) Prior Publication Data

US 2008/0316734 A1 Dec. 25, 2008

(51) Int. Cl.
*B60Q 1/00* (2006.01)

(52) U.S. Cl. ........................ 362/373; 362/294; 362/105

(58) Field of Classification Search ................. 362/202, 362/103, 105, 294, 373, 547, 800
See application file for complete search history.

(56) References Cited

U.S. PATENT DOCUMENTS 1,901,180 A 3/1933 McBride
4,794,496 A 12/1988 Lanes et al.
D405,202 S 2/1999 Fattori et al.
6,039,461 A * 3/2000 Cummings et al. .......... 362/287
6,478,453 B2 * 11/2002 Lammers et al. ............ 362/294
D506,846 S 6/2005 Kang et al.
7,210,810 B1 5/2007 Iversen et al.
2002/0141197 A1 10/2002 Petroski
2005/0174753 A1 * 8/2005 Cao et al. ................... 362/106
2005/0174782 A1 8/2005 Chapman
2006/0087842 A1 4/2006 Alessio

OTHER PUBLICATIONS

Petzl TacTikka XP Adapt from www.brightguy.com (2 pages) and 2 photographs, ©1998-2007 Bright Guy, Inc.
Black Diamond—Icon 3 Watt + 4 LED Headlamp from www.gearx.com (2 pages), ©2004-2007 The Outdoor Gear Exchange, Inc.
Petzl: "MYO XP" Internet Citation, May 30, 2007, pp. 1-7, XP007904927, <http://fr.petzl.com/ProduitsServices/E83P_MYOXP_E83500-E.pdf>, retrieved on Jun. 10, 2008.
Petzl: "Tikka XP - Tactikka XP - Tactikka XP Adapt" Internet Citation, Sep. 13, 2006, pp. 1-10, XP007904925, <http://fr.petzl.com/ProduitsServices/E86P_TIKKAXP_E86504-F_W.pdf>, retrieved Jun. 11, 2008.
Patent Cooperation Treaty (PCT), International Search Report and Written Opinion for Application No. PCT/US2008/007241, filed Jun. 10, 2008, mailed Dec. 16, 2008, European Patent Office, Netherlands.
Patent Cooperation Treaty (PCT), International Search Report and Written Opinion for Application No. PCT/US2008/007250, filed Jun. 10, 2008, mailed Dec. 16, 2008, European Patent Office, Netherlands.

* cited by examiner

*Primary Examiner*—Ali Alavi
(74) *Attorney, Agent, or Firm*—Gregory J. Adams

(57) ABSTRACT

A headlamp lighting device is provided that allows for the adjustment of the size of the light beam and forward heat dissipation. The lighting device includes a housing, a light source provided on the housing for generating a light beam, and an optical focus lens disposed in the path of the light beam for focusing the light beam. The lighting device also includes a lens ring supporting the optical focus lens to move the focus lens relative to the light source to adjust size of the light beam. The lens ring also serves as an outer heat sink in thermal conductive relationship with an inner heat sink.

18 Claims, 6 Drawing Sheets

LIGHTING DEVICE HAVING FORWARD DIRECTED HEAT SINK ASSEMBLY

BACKGROUND OF THE INVENTION

The present invention generally relates to lighting devices and, more particularly, to a portable lighting device, such as a headlamp that can be worn on the head of a user.

Portable lighting devices, such as flashlights and headlamps, generally employ a light source, such as an incandescent lamp or one or more light emitting diodes (LEDs), a reflector, a lens, and a power source, such as one or more electrochemical cell batteries. A conventional headlamp typically includes a strap adapted to fit on the head of a user to position the headlamp in the vicinity of a user's forehead. Most conventional headlamps provide a fixed light beam or allow for a selection of various combinations of LEDs to provide different color and intensities of light illumination. Some flashlights allow movement of the reflector to change the light beam, which often results in a non-uniform beam intensity.

Lighting devices, such as headlamps, employ light sources that generate thermal energy (heat). To enhance performance with a light source such as an LED, the LED is generally required to operate below extreme temperatures. When the LED operates at an elevated temperature, the output light intensity, typically measured in lumens, and output light efficiency usually decreases. Thus, there is a need to prevent overheating of the LED to provide efficient lighting performance. Additionally, in conventional headlamp assemblies, heat generated by the light source usually is conducted towards the rear of the headlamp and may be transferred to the user's forehead, which may be undesirable.

Accordingly, it is therefore desirable to provide for a portable lighting device, such as a headlamp, that effectively controls the temperature and maintains a desired operating temperature of the light source and provides a desirable light illumination beam.

SUMMARY OF THE INVENTION

In accordance with one aspect of the present invention, a lighting device is provided that conducts heat away from the light source and toward the front end of the lighting device. The lighting device includes a housing having a front end and a rear end and a light source mounted near the front end of the housing, the light source being energizable to generate light illumination and thermal energy. The lighting device also includes an inner thermally conductive heat sink disposed in thermal relationship with the light source. The lighting device further includes an outer heat sink member in thermal heat transfer relationship with the inner heat sink and disposed generally forward of the rear end of the housing for directing thermal energy generated by the light source towards the front end of the housing.

According to another aspect of the present invention, a headlamp is provided the dissipates thermal energy generated by the light source away from the rear end and towards the front end. The headlamp is adapted to fit on the head of a user and includes a housing having a front end and a rear end, and a strap engaged to the housing and adapted to fit on the head of a user. The headlamp includes a light source mounted near the front end. The headlamp also includes an inner thermally conductive heat sink in thermal communication with the light source. The headlamp further includes an outer thermally conductive heat sink in thermal communication with the inner heat sink and disposed generally forward of the rear end of the housing for directing thermal energy generated by the light source towards the front end of the housing.

DETAILED DESCRIPTION OF THE PREFERRED EMBODIMENTS

Figure 4:
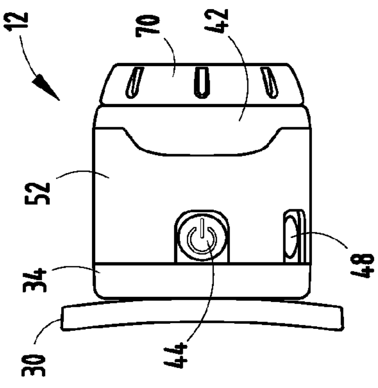
FIG. 4 is a top view of the front lighting assembly.
Figure 2:
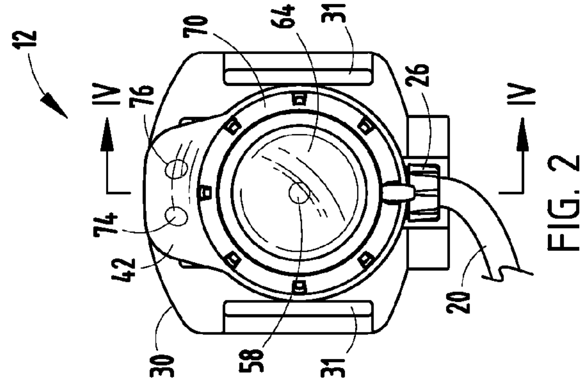
FIG. 2 is a front view of the front lighting assembly of the headlamp.
Figure 3:
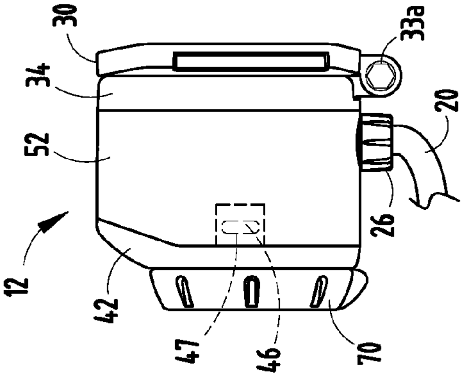
FIG. 3 is a right side view of the front lighting assembly.
Figure 1:
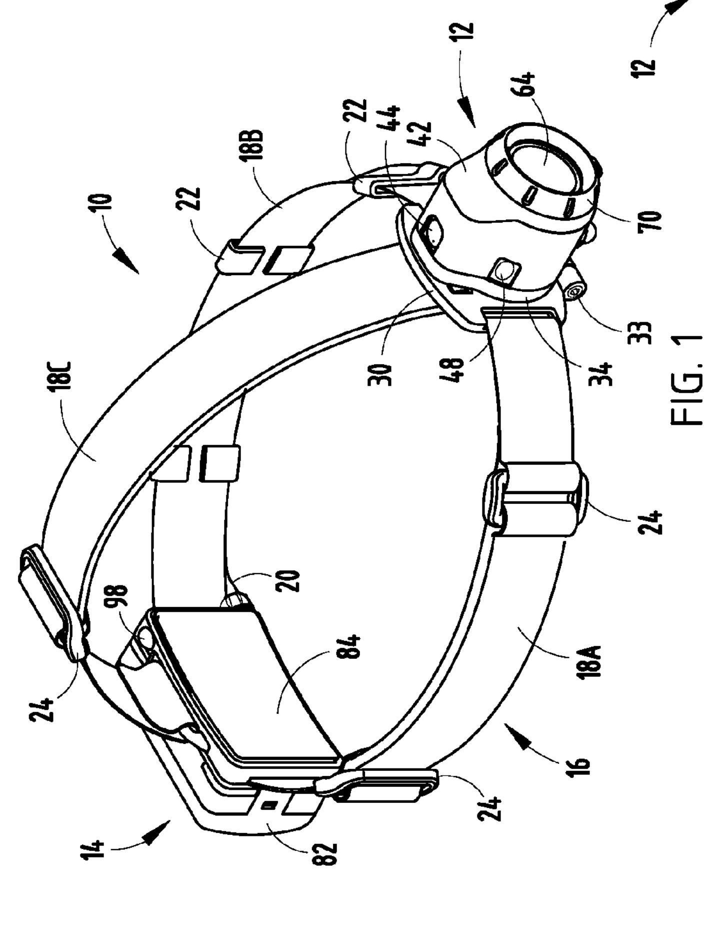
FIG. 1 is a front perspective view of a headlamp lighting device adapted to fit on the head of a user, according to one embodiment of the present invention.

Referring to FIG. 1, a lighting device 10 is generally shown having an adjustable optical focus lens assembly and a heat sink assembly, according to one embodiment of the present invention. The lighting device 10 is shown and described as a headlamp adapted to be worn on the head of a user. While the lighting device 10 is shown and described herein as a headlamp, it should be appreciated that the lighting device 10 may be employed in any of a number of lighting systems to provide light illumination to a target area.

The lighting device 10 generally includes a front light assembly 12, a rear battery pack assembly 14, and a strap 16 configured to position and hold the lighting device 10 on the head of a user. The strap 16 is connected to both the front light assembly 12 and rear battery pack assembly 14. The strap 16 includes side strap portions 18A and 18B that are generally adapted to wrap around the sides of a user's head and a top strap portion 18C adapted to fit over the top of the user's head. The strap 16 includes adjustment buckles 24 that allow for adjustment of the size of the strap 16 to fit a particular user.

The battery pack assembly 14 may be provided in different sizes and shapes to accommodate different size batteries. For example, a user may employ larger AA-size batteries in one battery pack to realize extended use time, or may employ smaller AAA-size batteries in another battery pack to lessen the size and weight. A user may find it desirable to remove the top strap portion 18C, particularly when a lighter battery pack is used. Additionally, the lighting device 10 has an electrical power cable 20 connecting the rear battery pack assembly 14 to the front light assembly 12. The power cable 20 may have two electrical circuit paths provided by two wires or a coaxial cable to provide electrical power from positive and negative terminals of energy storage batteries within the battery pack assembly 14 to one or more light sources in the light assembly 12. The power cable 20 is shown held in place relative the strap 16 by way of clips 22.

The light assembly 12 is illustrated in more detail in FIGS. 2-5. The light assembly 12 includes a rear base plate 30 that is connected to strap portions 18A-18C of strap 16 at the back of the assembly 12. Base plate 30 is adapted to be positioned on a user such that the rear surface contacts the user's forehead. The individual strap portions 18A-18C of strap 16 connect to base plate 30 via side and top bracket arms 31. According to one embodiment, base plate 30 is made of a polymeric material that is thermally insulative and therefore does not easily conduct heat such that it is not thermally conductive. Base plate 30 also has a pair of hinge connectors 32 at the bottom edge adapted to matingly engage a hinge connector 35 on a rear plastic housing member 34 via bolt 33 and nut 33*a* such that housing 34 is pivotable relative to base plate 30.

The rear housing member 34 forms the back portion of a housing that contains various components of the light assembly 12. The rear housing portion 34 is connected to a front main housing portion 42 and is held in place via fasteners 37. Disposed between the rear housing portion 34 and front main housing portion 42 is a seal 36 that provides a water tight sealing engagement of the two housing members. A plastic threaded ring 38 has outer threads that engage groves 39 on the inside of housing portion 42. Ring 38 abuts a shaped insert 40 to hold it in place. Fasteners 37 connect rear housing member 42 to insert 40. Shaped insert 40 serves as a spacer and has a shape configured to receive and hold in place a circuit board 50. It should be appreciated that each of the rear housing member 34 and front main housing member 42 are made of polymeric material that is thermally insulated and therefore not thermally conductive. Similarly, the shaped insert 40 and ring 38 are made of a polymeric material that is not thermally conductive.

Extending into the interior surface of the main housing portion 42 through slots 47 in opposite side walls is a pair of inward extending tabs 46 that generally form male members. The male members 46 are shown as inserts positioned on opposite sides of housing member 42 and are adapted to engage a recessed slot in an adjustment mechanism to allow movement of a focus lens.

A circuit board 50 is disposed within main housing portion 42 and includes electrical circuitry to turn the lighting device 10 on and off and to control the lighting sequence. Assembled to the bottom of main housing portion 42 is a cable connector 26 that connects to the power cable 20 to receive electrical power from the battery pack assembly 14 that is supplied to circuitry on the circuit board 50 and to provide electrical power to the light source(s). Mounted on the circuit board are circuit components, including control circuitry 78. In addition, a pair of LEDs 74 and 76 are mounted on the upper front surface of circuit board 50 and serve as secondary light sources. The LEDs 74 and 76 may include red LEDs, according to one embodiment. With the circuit board 50 assembled onto shaped insert 40 within housing 42 the LEDs 74 and 76 are located behind the upper transparent portion of first housing 42. In one embodiment, the entire front housing 42 may be transparent.

Assembled to the top side of housing 42 is a first user-depressible push button 44 for turning the light source(s) on and off and for sequencing amongst selectable light intensities. Additionally, a second user-depressible push button 48 is provided for allowing user activation of a turbo mode to increase the light intensity provided by the primary light source.

An outer cover housing member 52 engages main housing body 42. It should be appreciated that the outer cover housing member 52, main housing body 42 and rear housing portion 34 essentially form a housing that supports and houses the various components including the light source, circuitry, and various other components as described herein. While the housing is generally shown made up of housing portions 34, 42 and 52, it should be appreciated that other shapes, sizes and number of components could be employed to provide for a housing for the lighting device 10.

An inner heat sink 54 is disposed within housing 42. Inner heat sink 54 is made of a thermally conductive material, such as aluminum. The inner heat sink member 54 is located forward of the circuit board 50, and thermally non-conductive plastic members 40, 38 and 34. Inner heat sink 54 is generally shown in the shape of a ring having a partial cutout on top and a flat front surface. A substrate 56 is disposed on the front end surface of heat sink 54 and has openings for receiving lead connectors.

Mounted on top of substrate 56 is a light emitting diode (LED) 58, which serves as the primary light source. LED 58 may be soldered to substrate 56. The LED 58 may include electrical leads that extend through substrate 56 from circuit board 50 to receive electrical power supplied from the circuit board 50 and battery pack assembly 14. Primary LED 58 is held in position with inner heat sink 54 by threadingly engaging the front end of inner heat sink 54 to the rear end of reflector 60, such that LED 58 extends through an opening provided in the central region of reflector 60. Alternatively, the LED 58 and substrate 56 may be secured to inner heat sink 54 using fasteners (e.g., screws). Also, the inner heat sink 54 may be retained to reflector 60 using screws. The reflector 60 may include a reflective surface that reflects some portion of light illumination generated by the primary LED 58. It should be appreciated that with some LEDs, substantially all the light generated may be projected forward in a narrow window, such that the reflector 60 reflects little or no light.

According to one embodiment, the primary light source 58 is implemented as a high power white LED, which are generally known to those skilled in the art. One example of such a commercially available LED is Model No. XRE, commercially available from Cree, Inc. It should be appreciated that various types and sizes of LEDs are readily available from several commercial suppliers. The LED can be of any color, depending upon the choice of the user. It should further be appreciated that other primary light sources, such as incandescent lamps, may be employed in place of the LED, or that multiple LEDs may be employed alone or in combination with one or more other light sources.

Assembled onto the main housing body 42 is a thermally conductive lens ring 70 that serves as a lens adjustment mechanism and also serves as an outer heat sink. The lens ring 70 is generally cylindrical and configured to receive and hold an optical focus lens 64. The optical focus lens 64 is shown having threading 62 on the outer surface for engaging slot 68 on the interior surface of lens ring 70. A seal ring 65 is disposed between lens 64 and the inner surface of lens ring 70 to ensure water tightness. Accordingly, the focus lens 64 is threadingly engaged within lens ring 70 which, in turn, engages housing 42. A seal 66 disposed between the lens ring 70 and housing 42 to provide a water tight enclosure.

The lens ring 70 has a recessed slot 72 formed in the outer cylindrical surface for engaging male members 46 in housing 42. The recessed slot 72 is formed in a generally helical shape and serves as a female receptacle. In the embodiment shown, the female receptacle 46 spirals in the shape of a double helix having a desired turn ratio to enable movement of the lens ring 70 with a single optical focus lens 64 forward and backward relative to the primary light source 58. Thus, the optical focus lens 64 rotates within lens ring 70 so as to translate the lens 64 forward and backwards relative to the primary light source 58 to change the focal length to change the size of the light beam. It should be appreciated that the female receptacle 72 has end of travel limits that serve to limit the travel of male members 46 to define the end of rotation travel limits. As such, the lens ring 70 and lens 64 is rotatable as a unit clockwise and counterclockwise so as to move axially toward and away from the light source 58.

Figure 6B:
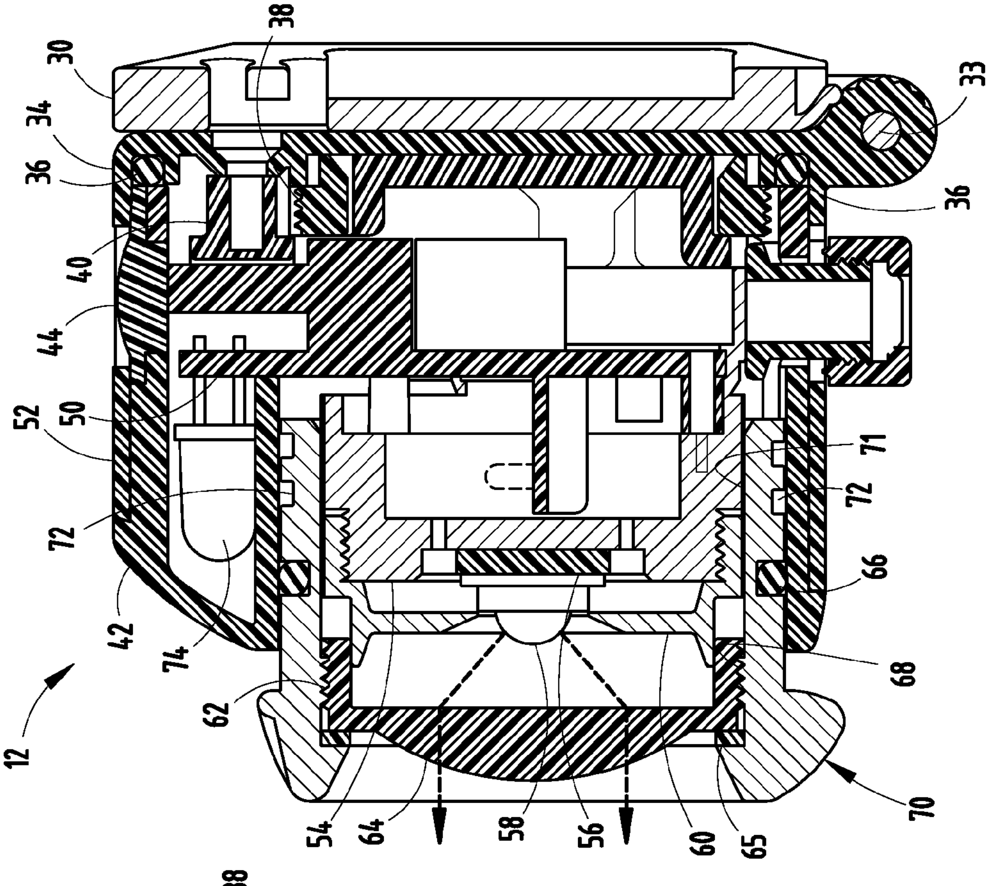
FIG. 6B is a cross-sectional view of the front lighting assembly taken through lines VI-VI of FIG. 2 with the focus lens adjusted to the forward most position.
Figure 6A:
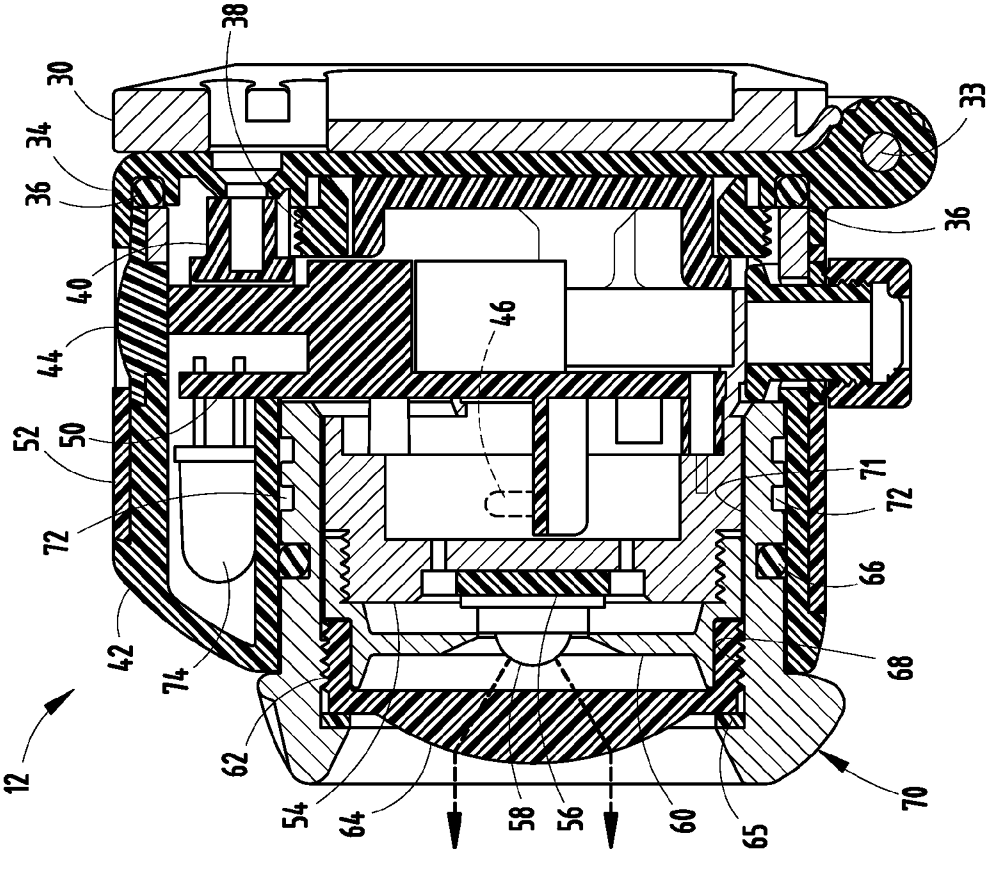
FIG. 6A is a cross-sectional view of the front lighting assembly taken through lines VI-VI shown in FIG. 2 with the focus lens adjusted to the rearward most position.
Figure 8:
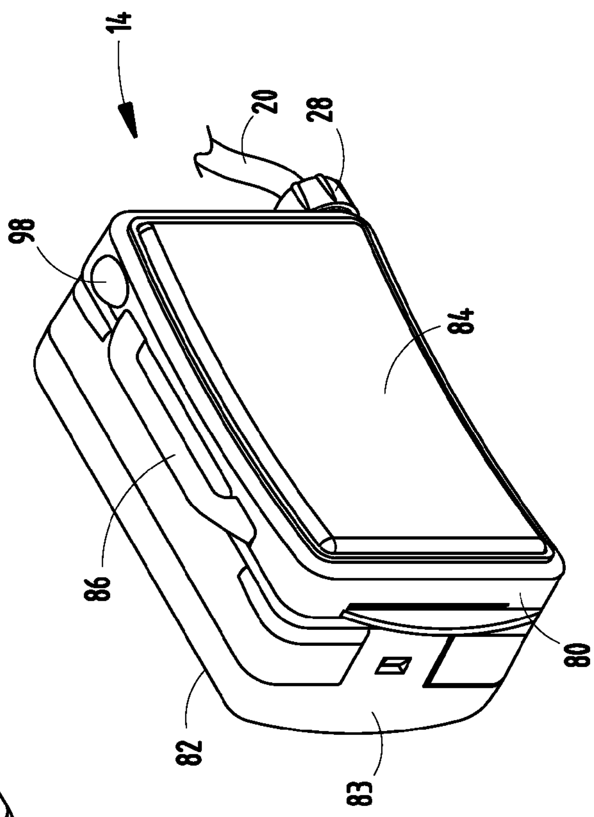
FIG. 8 is a front perspective view of the battery pack assembly.
Figure 7:
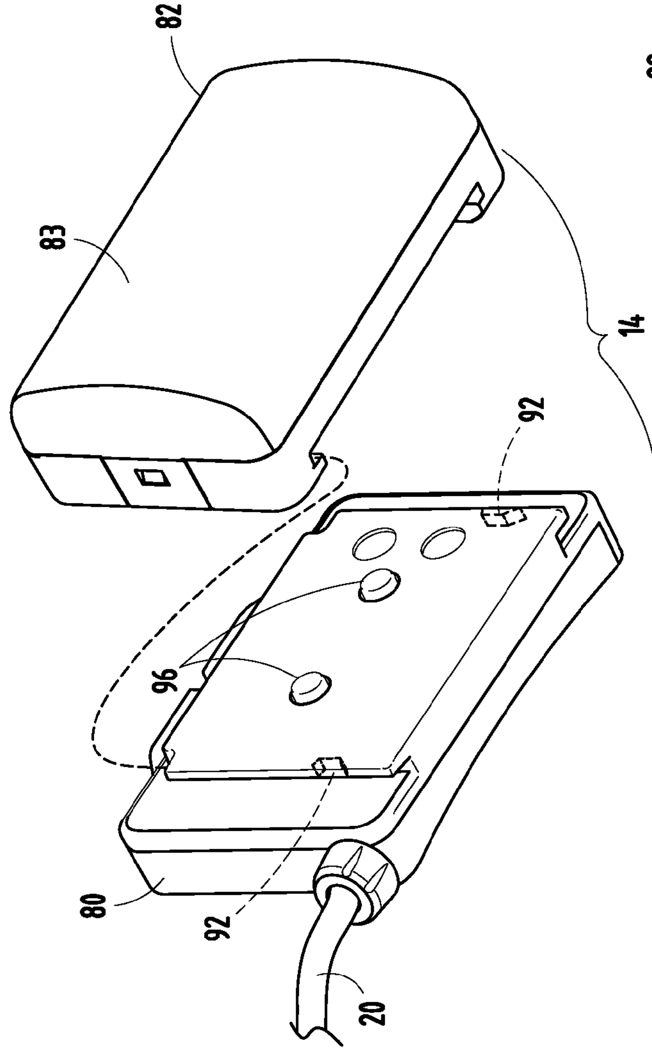
FIG. 7 is an exploded rear perspective view of a rear battery pack assembly, according to one embodiment.

Accordingly, the lighting device 10 employs an optical focus lens, in the form of a magnifier lens 64 that redirects light generated by the LED 58 through the optical focus lens 64 in the desired pattern. The adjustable lens ring 70 is rotatable so as to move lens ring 70 and the optical lens 64 forward and backward relative to the light source 58. Lens ring 70 may be rotated in one direction to move focus lens 64 closer to the primary LED 58 as shown in FIG. 6A, or may be rotated in the opposite direction to move focus lens 64 away from the primary LED 58 as seen in FIG. 6B. By moving the optical focus lens 64 toward and away from LED 58, the size and intensity of the light may be adjusted, while maintaining a substantially uniform beam pattern.

Thus, it should be appreciated that the adjustment mechanism provides for movement of a single focus lens relative to the LED 58 to achieve a uniform light beam zoom feature that focuses the light beam and allows for adjustment of the light beam size while substantially maintaining beam uniformity. Accordingly, the spotlight beam generated by the lighting device 10 may be adjusted to zoom from a small circular high intensity spot to a large circular less intense floodlight beam without going out of focus during the transformation, by employing a single focus lens.

The optical magnifier lens 64 is a plano convex magnifier lens having a convex surface, according to one embodiment. It should be appreciated that the magnifier lens 64 could include other shapes, such as a dual convex magnifier lens. The magnifier lens 64 has at least one convex surface, according to one embodiment, to redirect the light illumination generated by the light source 58 transmitted through the focus lens 64 into a desired size beam pattern so as to provide a substantially uniform light intensity that remains uniform throughout the beam area as the focus lens 64 moves relative to the primary light source 58.

According to one example, the primary LED 58 is a high-intensity LED capable of generating high intensity light (e.g., greater than 100 lumens) at 350 milliamps of current or higher. One example of the LED 58 is a Model XRE, commercially available from Cree, Inc. With a plano convex magnifier lens 64, the adjustable lens ring 70 may be rotated between the end of travel limits defined by slot 72 and tabs 46 by a longitudinal distance of 4.5 mm of travel, so as to collimate the light beam and maintain a selected intensity pattern, such as a substantial uniform intensity, according to one embodiment.

Figure 5:
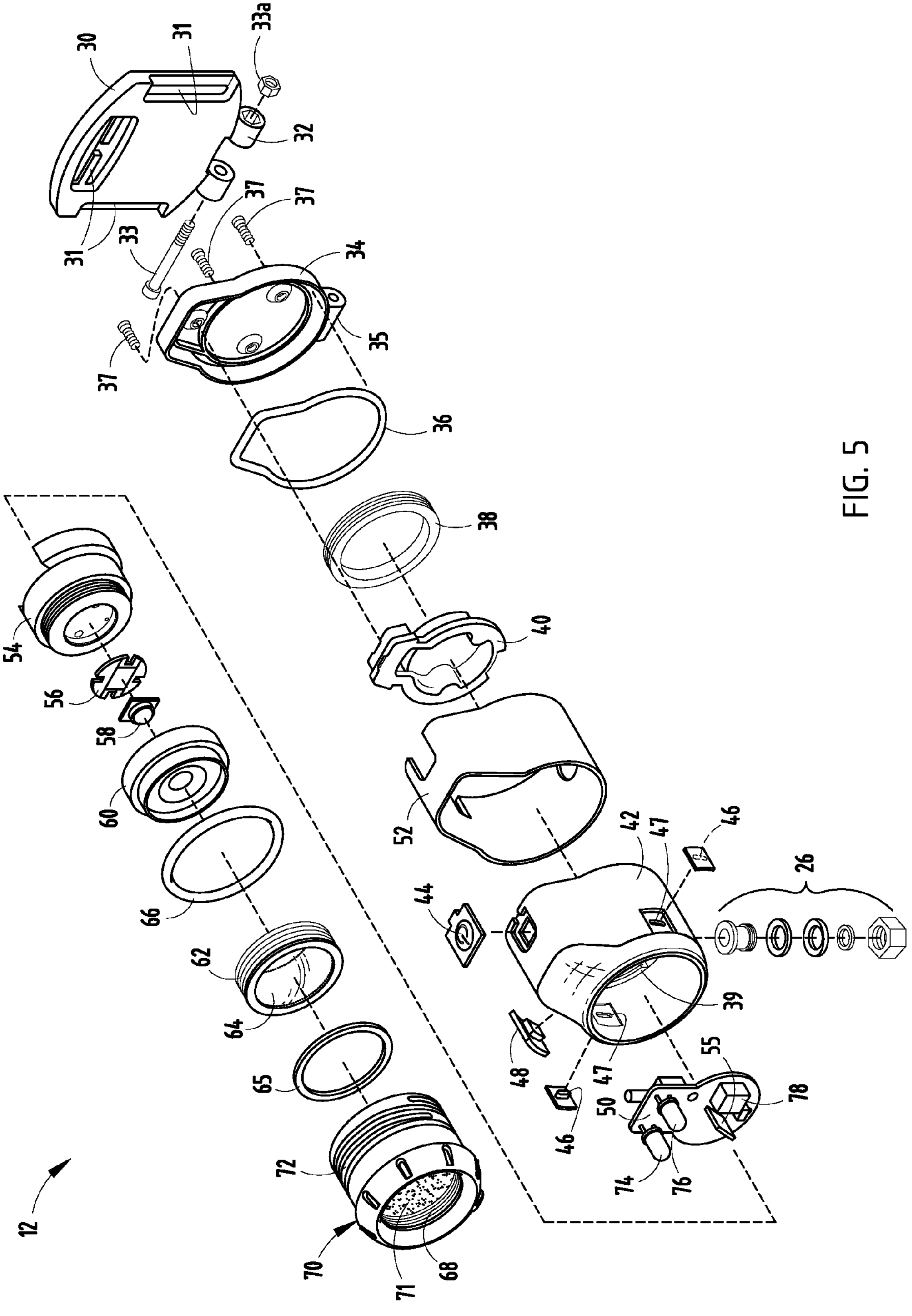
FIG. 5 is an exploded assembly view of the front lighting assembly.

As seen in FIG. 5, the circuit board 50 has the additional pair of secondary LEDs 74 and 76 which generally extend within the upper portion of housing member 42 above the lens ring 70. LEDs 74 and 76 are viewable through a substantially light transparent front wall of housing body 42. Thus, LEDs 74 and 76 are viewable through the upper front portion of housing 42, when energized. The LEDs 74 and 76 may include red LEDs, according to one embodiment, which offer enhanced night vision illumination. According to other embodiments, one or more secondary LEDs 74 and 76 may be employed in various colors or combinations of colors to provide a desired light illumination.

Also shown mounted on circuit board 50 are electrical components such as circuit component 78. It should be appreciated that any of a number of electrical circuit configurations may be employed to provide control of the lighting device 10. For example, electrical circuitry 78 may be configured with intelligence in the form of a microprocessor to provide control routines to selectively control energizeration of the primary LED 58, and pair of secondary LEDs 74 and 76. According to one embodiment, control circuitry 78 is configured to select energization of the light source LEDs 58, 74 and 76 based on actuation of the first user selectable push button 44. The following control sequence may be employed according to one example. A user depression of push button 44 may initially turn on the pair of red LEDs 74 and 76. Successive actuations of push button 44 within a predetermined time period, such as 1.6 seconds, may allow for sequential activation of other light sources and combinations of light sources. For example, a second depression of push button 44 may switch to the main LED 58 being set on high. Repeated depressions of push button 44 may sequence amongst setting the main LED 58 on a medium setting, followed by a low setting, followed by a flashing of the main LED 58, and finally turning the light source off. If a user fails to depress the push button 44 within the predefined time period, then the control routine is configured to turn off the light sources at the next push button depression.

The second user selectable push button 48 is generally shown provided on one side of the housing body 42, separate from the push button 44, and serves as the turbo mode actuator. The turbo mode push button 48 is depressible to allow a user to activate the light source 58 at an increased light illumination. By continuously depressing the turbo mode push button 48, increased electrical current is supplied to the primary LED 58 to increase the light illumination. According to one example, the primary LED 58 may operate in its normal high setting powered at an electric current of 700 milliamps to achieve light illumination of about 130 lumens, whereas in the turbo mode, the primary LED 58 may be powered at an electric current of 1,200 milliamps to achieve light illumination of about 190 lumens. The control circuitry 78 may be configured to provide for enhanced illumination of the primary LED 58 while in the turbo mode during a limited time period, such as 15 seconds, so as to prevent overheating of the LED 58 and excessive heat buildup in the light assembly 12.

In addition, a thermistor 55 may be mounted within the housing 42, such as on circuit board 50 in thermal relationship to the primary LED 58 to sense temperature in the vicinity of the LED 58. Temperature monitored by the thermistor 55 may be used to shut off the turbo mode when the sensed temperature exceeds a predefined temperature limit, such as 75° C. It should also be appreciated that the thermistor 55 may be employed to shut off the entire lighting device 10 upon reaching an excessive temperature limit.

With particular reference to FIGS. 6A and 6B, the thermal conductive heat sink path leading from the primary LED 58 to the thermal conductive lens ring 70 for dissipation to the surrounding environment is illustrated. It should be appreciated that the lighting assembly 12 of lighting device 10 is configured to sink thermal energy (heat) away from the primary LED 58 through a thermal conductive path that leads to the outside environment for dissipation with the surrounding environment. In doing so, the thermal conductive heat exchange path is provided such that thermal energy is substantially dissipated forward of the lighting assembly 12. In doing so, substantial thermal energy is prevented from conducting rearward to the back plate 30. Therefore, particularly in the headlamp embodiment, the lighting device 10 minimizes thermal energy that is transferred to the user.

The thermal conductive lens ring 70 serves as an outer heat sink shown in thermal contact with the inner heat sink 54. Inner heat sink 54, in turn, is in contact with underlying substrate 56 of primary LED 58. Thermal energy generated by primary LED 58 passes through substrate 56 to heat sink 64 which in turn passes to the thermal conductive ring 70 which extends to the front of the light assembly 12. Disposed between the inner heat sink 54 and lens ring 70 is a thermally conductive medium 71. The thermally conductive medium 71 includes a thermal conductive grease such as silicon grease or paste that provides thermal conductivity between the lens ring 70 and heat sink 54 and also provides lubrication to allow the lens ring 70 to move relative to the heat sink 54 when the lens ring 70 is rotated to adjust the position of the focus lens 64. According to one example, the thermal conductive grease may include Omegatherm® 201, commercially available from Omega Engineering, Inc. Thus, enhanced thermal conductivity is achieved between the inner heat sink 54 and the outer heat sink of lens ring 70 to further enhance thermal conductivity to dissipate thermal energy away from the primary LED 58 to the outside environment generally forward of the user. By dissipating thermal energy away from the primary LED 58, enhanced operation of the primary LED 58 may be achieved by maintaining the operating environment at a lower temperature and may help to increase the life of the LED.

Referring to FIGS. 7-11, the battery pack assembly 14 is illustrated according to one embodiment. The lighting device 10 may include multiple battery compartments, one of which may be used at a time with the battery pack assembly 14. The battery pack assembly 14 includes a base housing 80 having a cable connector 28 connected to cable 20 which leads to electrical connection within the battery pack. A battery pack compartment 82 is connected to the base member 80 and includes a battery compartment for receiving batteries of a certain size and number to provide electrical power to the lighting assembly. Compartment 82 has a cover 83 with resilient side arms 88 that lock onto tabs 89 in the closed position. Cover 83 can be removed to access the batteries. The front wall of base housing 80 may further have a pad 84 adapted to engage the back side of a user's head.

Figure 10:
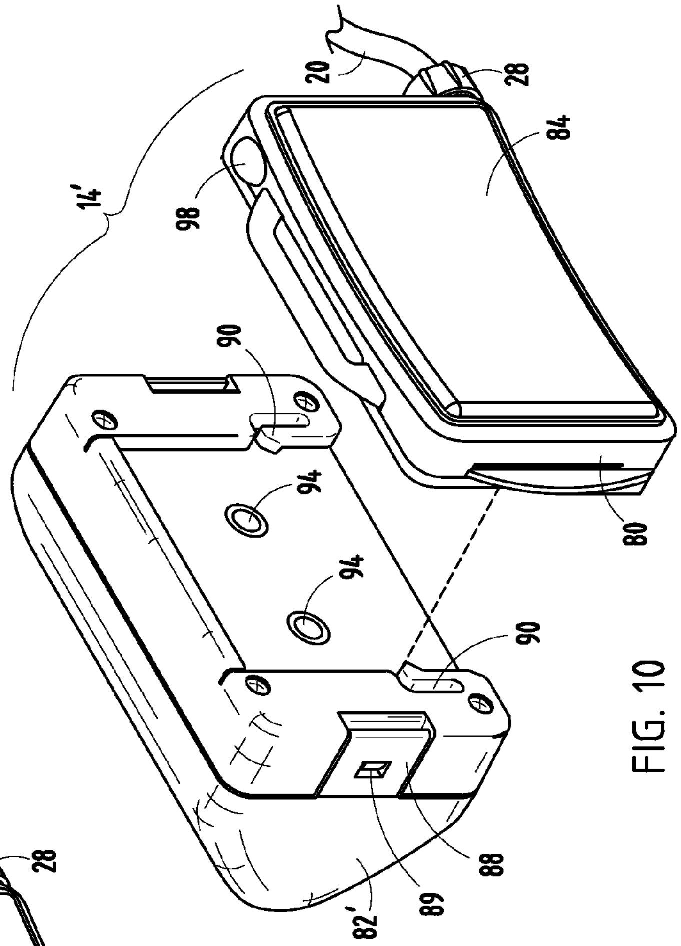
FIG. 10 is an exploded front perspective view of the battery pack assembly employing a second user selectable battery pack adapted to receive AA-size batteries.
Figure 9:
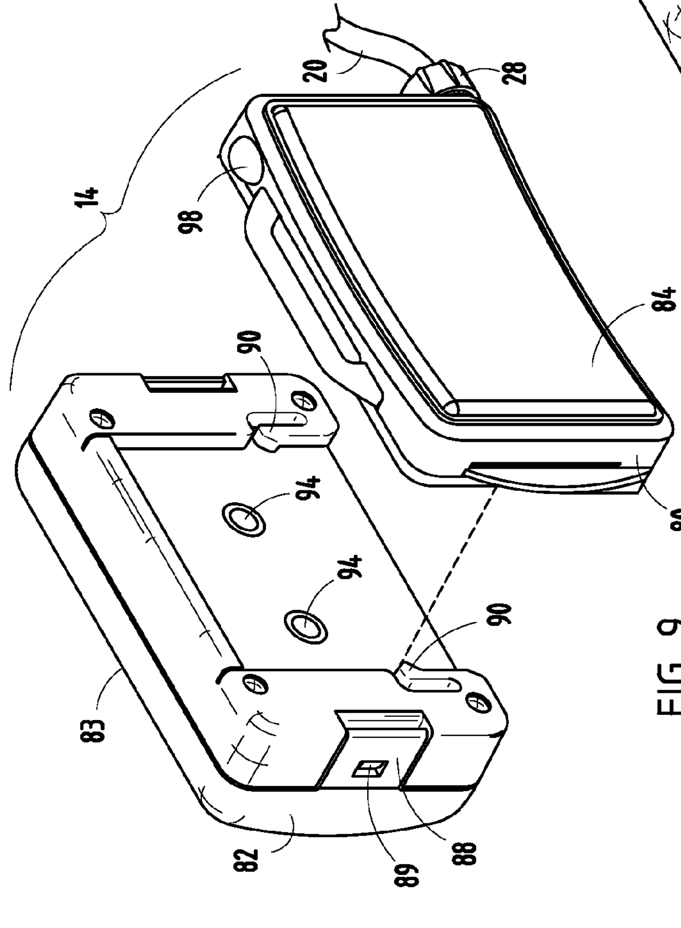
FIG. 9 is an exploded front perspective view of the battery pack assembly employing a first user selectable battery pack adapted to receive AAA-size batteries.

The battery pack 82 connects to base member 80 by way of a pair of dovetail arms 90 on opposite sides that slide into locking engagement with notches 92. The battery pack 82 has sliding (wiping) contacts 94 that engage circuitry 96 in base member 80 such that they can easily be disconnected and the batteries replaced. As seen in FIG. 9, a first battery package 82 may be provided for housing batteries of a first size, such as AAA-size batteries. In contrast, a second battery pack 82' as seen in FIG. 10 may be employed to house a larger such, such as AA-size batteries. The second larger battery package 82' is larger and heavier and provides enhanced power capability. In contrast, the smaller battery pack 82 is smaller and weighs less. The user may select from either battery pack 82 or 82' for a given application and may simply slide the appropriate battery pack 82 or 82' onto the base member 80 for use with the battery pack assembly 14.

Figure 11:
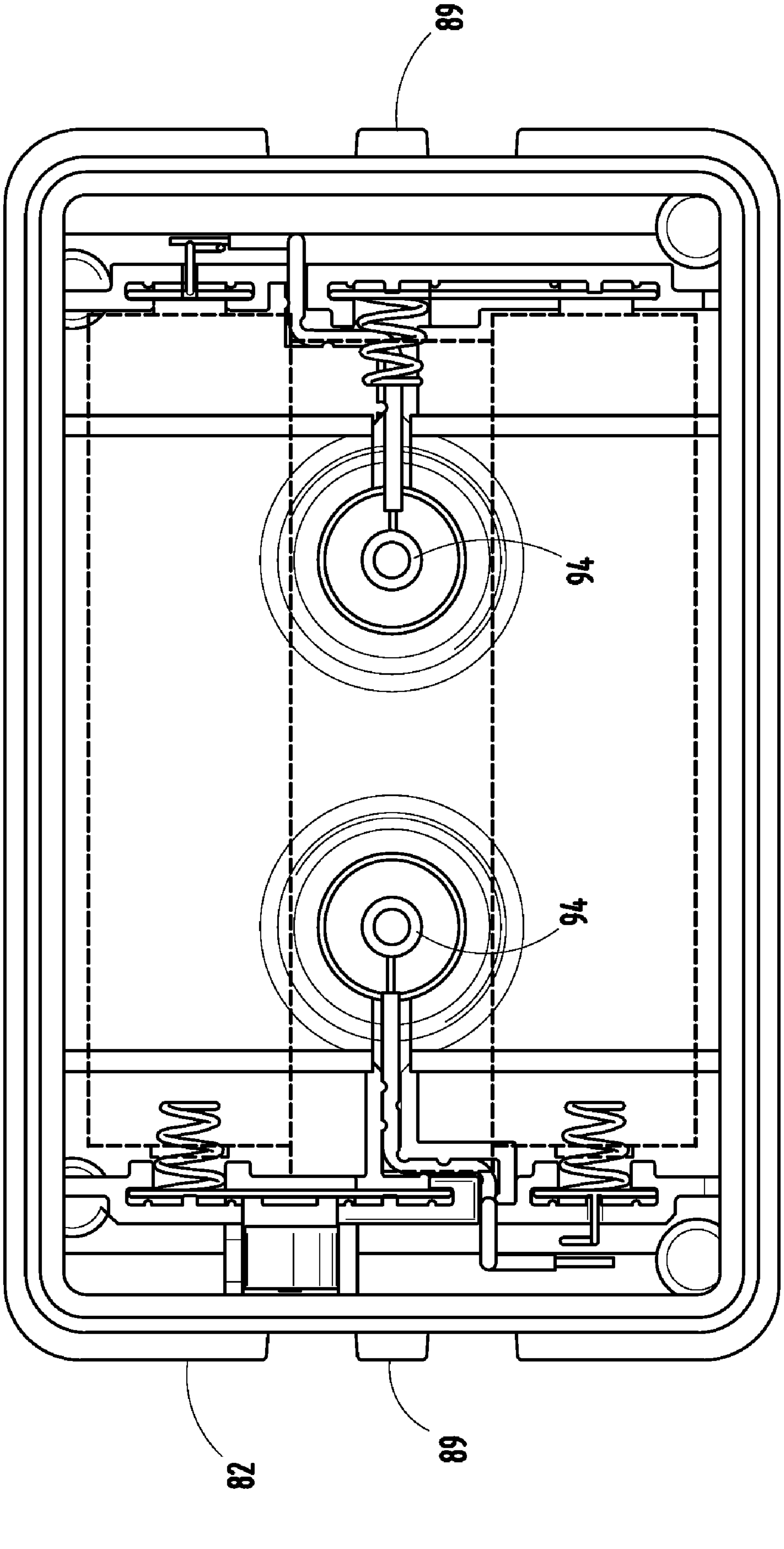
FIG. 11 is an interior view of the battery compartment of the battery pack shown in FIG. 9 with the cover removed, further illustrating the electrical connections.

Referring to FIG. 11, the battery compartment 82 is illustrated having electrical connections for receiving three AAA-size batteries. Also shown are contacts 94 that allow for engagement to the contacts 96 on base member 80.

The battery pack assembly 14 further includes an indicator light 98, such as an LED. The indicator light 98 may include a green LED, according to one example. The green LED 98 may serve as an indicator that the battery pack 82 is properly connected to the base member 80 such that adequate electrical connection is made. Additionally, the LED 98 may serve as a "find me" feature that blinks to allow for location of the lighting device 10. Further, the LED 98 may remain on when the lighting device 10 is energized to provide a visible light indication from behind the lighting device 10 and may therefore serve as a "follow me" feature.

Accordingly, the lighting device 10 of the present invention advantageously provides for an enhanced lighting device that offers an easy to adjust light illumination beam and advantageously dissipates thermal energy away from the light source and user. The lighting device 10 is particularly useful for use in a headlamp, but may be employed in other lighting devices.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

What is claimed is:

1. A lighting device comprising:
- a housing having a front end and a rear end;
- a light source mounted near the front end of the housing, said light source energizable to generate light illumination and thermal energy;
- an inner thermally conductive heat sink disposed in thermal relationship with the light source; and
- an outer heat sink member in thermal heat transfer relationship with the inner heat sink and disposed generally forward of the rear end of the housing for directing thermal energy generated by the light source towards the front end of the housing.

2. The lighting device as defined in claim 1, wherein the lighting device comprises a headlamp comprising a strap engaged to the housing and adapted to fit on the head of a user, wherein the outer thermally conductive heat sink dissipates thermal energy generated by the light source away from the head of the user.

3. The lighting device as defined in claim 2, wherein the lighting device further comprises a battery compartment connected to the strap and separate from the housing.

4. The lighting device as defined in claim 1, wherein the light source comprises a light emitting diode.

5. The lighting device as defined in claim 1, wherein the outer heat sink comprises a ring.

6. The lighting device as defined in claim 5 further comprising a focus lens disposed within the ring.

7. The lighting device as defined in claim 6, wherein the ring is adjustable to move the focus lens relative to the light source to adjust size of the light beam.

8. The lighting device as defined in claim 1 further comprising a thermally conductive medium disposed between the inner heat sink and the outer heat sink.

9. The lighting device as defined in claim 8, wherein the thermally conductive medium comprises a thermal conductive grease.

10. A headlamp adapted to fit on the head of a user, said headlamp comprising:
- a housing having a front end and a rear end;
- a strap engaged to the housing and adapted to fit on the head of a user;

a light source mounted near the front end of the housing;

an inner thermally conductive heat sink in thermal communication with the light source; and an outer thermally conductive heat sink in thermal communication with the inner heat sink and disposed generally forward of the light source for directing thermal energy generated by the light source towards the front of the housing.

11. The headlamp as defined in claim 10, wherein the light source comprises a light emitting diode.

12. The headlamp as defined in claim 10 further comprising a battery compartment connected to the strap and separate from the housing.

13. The headlamp as defined in claim 10 further comprising a thermal conductive medium disposed between the inner heat sink and the outer heat sink.

14. The headlamp as defined in claim 13, wherein the thermal conductive medium comprises a thermal conductive grease.

15. The headlamp as defined in claim 10, wherein the outer heat sink comprises a ring.

16. The headlamp as defined in claim 15 further comprising a focus lens disposed within the ring.

17. The headlamp as defined in clam 16, wherein the ring is adjustable to move the focus lens relative to the light source to adjust size of the light beam.

18. The headlamp as defined in claim 10 further comprising one or more non-thermally conductive mediums disposed between the inner heat sink and the rear end of the housing.

* * * * *